United States Patent [19]
Rutledge

[11] 3,948,347
[45] Apr. 6, 1976

[54] ACOUSTICAL PANEL
[75] Inventor: Richard A. Rutledge, Fraser, Mich.
[73] Assignee: Gallagher-Kaiser Corporation, Detroit, Mich.
[22] Filed: Nov. 25, 1974
[21] Appl. No.: 526,505

[52] U.S. Cl. ............... 181/33 G; 52/145; 52/615; 428/76; 428/130; 428/131; 428/255
[51] Int. Cl.² ................ B32B 15/02; G10K 11/04
[58] Field of Search ............. 161/68, 69, 108, 89; 181/33 G; 52/145, 615–618; 156/197; 428/74, 75, 76, 119, 130, 131, 255, 256

[56] References Cited
UNITED STATES PATENTS

| | | | |
|---|---|---|---|
| 1,952,975 | 3/1934 | Davy | 52/145 |
| 2,096,233 | 10/1937 | Ericson | 52/145 X |
| 2,939,811 | 6/1960 | Dillon | 161/DIG. 4 |
| 2,966,954 | 1/1961 | Sabine | 52/145 X |
| 2,998,337 | 8/1961 | Tillotson | 52/145 X |
| 3,092,203 | 6/1963 | Slayter et al. | 161/DIG. 4 |
| 3,095,943 | 7/1963 | Kemp | 161/68 X |
| 3,301,732 | 1/1967 | Kunz | 156/304 |
| 3,769,767 | 11/1973 | Scott | 52/145 |
| 3,822,762 | 7/1974 | Crispin et al. | 161/89 |
| 3,872,640 | 3/1975 | Megumi | 52/615 X |

*Primary Examiner*—William J. Van Balen
*Assistant Examiner*—Henry F. Epstein
*Attorney, Agent, or Firm*—Harness, Dickey & Pierce

[57] ABSTRACT

A sandwich type acoustical panel comprising a fibrous matrix, a diaphragmatic plastic skin overlying the matrix, a perforated metal face sheet spaced from the plastic skin, and means disposed between the metal sheet and plastic skin creating an air space therebetween. The space permits sound-activated air to be distributed over the plastic skin.

4 Claims, 2 Drawing Figures

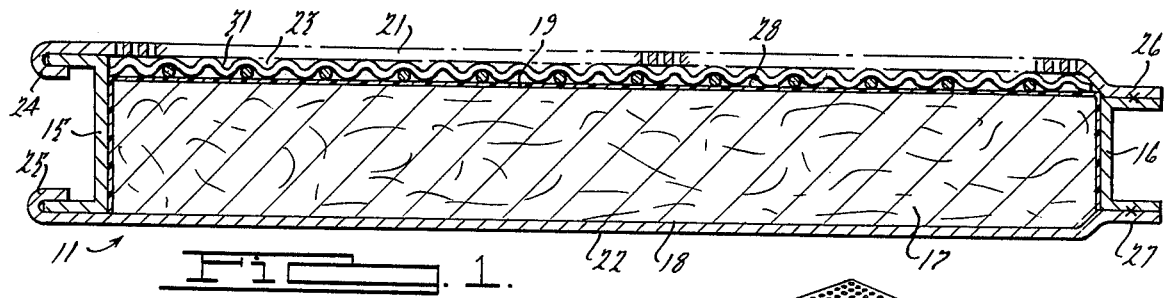
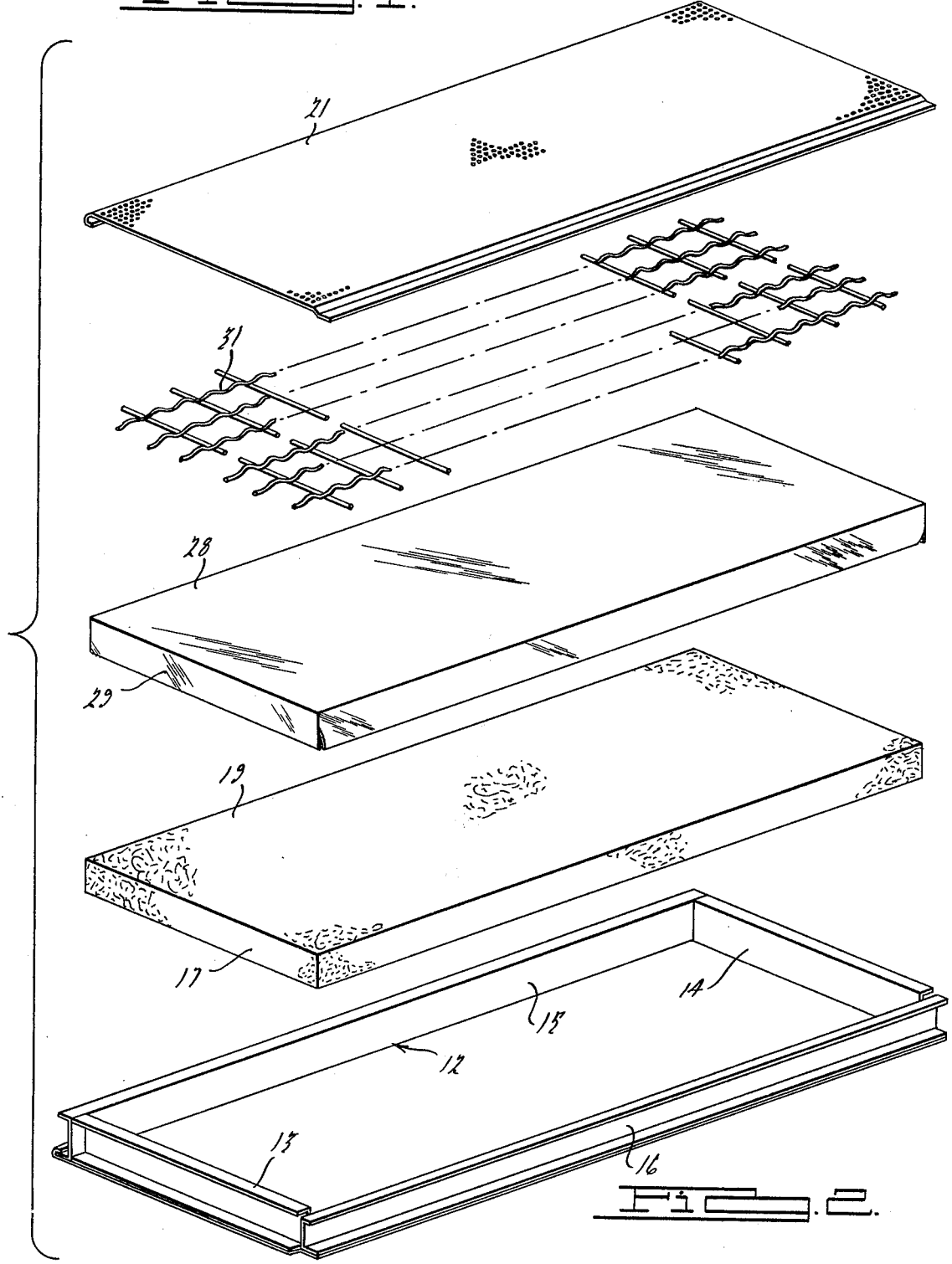

ACOUSTICAL PANEL

BACKGROUND OF THE INVENTION

1. Field of the Invention

This invention relates to acoustical panels, and more particularly to panels usable in the construction of ceilings, partitions or other structures and which act to absorb and act as a barrier to sound.

2. Description of the Prior Art

A preliminary search on the subject matter of this invention revealed Davy U.S. Pat. No. 1,952,975 and Sabine U.S. Pat. No. 2,966,954. These patents disclose sound absorbent units having some of the elements found in the present invention, but neither patent suggests the combination of components presently disclosed and claimed which have been found to yield superior sound absorbing qualities.

Other U.S. Pat. Nos. found in the search which are of general interest are the following:

1,739,754 Foster Dec. 17, 1929
2,022,161 Spafford Nov. 26, 1935
2,096,233 Ericson Oct. 19, 1937
2,690,594 Kirksey Oct. 5, 1954
3,021,915 Kemp Feb. 20, 1962
3,095,943 Kemp July 2, 1963
3,124,212 Stephens Mar. 10, 1964
3,204,380 Smith et al Sept. 7, 1965

BRIEF SUMMARY OF THE INVENTION

It is an object of the present invention to provide a novel and improved sandwich type acoustical panel which permits sound to enter with a minimum of resistance but has an extremely high degree of sound absorption, excellent sound barrier characteristics and protection for the matrix from air, water, dust and chemical contamination.

Briefly, the illustrated embodiment of the invention comprises an acoustical panel having a fibrous matrix, a plastic skin overlying one surface of said matrix closely adjacent thereto, a perforated metal face sheet, and means disposed between said sheet and skin creating an air space therebetween whereby sound entering the air space will be distributed by the skin over the area of the matrix.

BRIEF DESCRIPTION OF THE DRAWINGS

FIG. 1 is a cross-sectional view of an acoustical panel constructed in accordance with the invention.

FIG. 2 is an exploded perspective view showing the panel components, the back sheet being omitted.

DESCRIPTION OF THE PREFERRED EMBODIMENT

The acoustical panel is generally indicated at 11 and is shown as being held by a frame generally indicated at 12. The frame has two transverse channel members 13 and 14 and two longitudinal channel members 15 and 16. The latter two channel members have different heights so that adjacent panels may be interlocked with male and female joints. The panel width and length will of course vary depending upon use, it being understood that the panel may be attached in various ways such as by welding, metal screwing or hanging from ceilings. Panels incorporating the principles of this invention could be used for stationary or movable partitions, ductwork, soffits, space absorbers, rooms, doors or entire structures, and the method of attachment will depend upon use.

A matrix 17 is disposed within frame 12. This matrix may be fabricated of a conventional sound-absorbing fibrous material such as U.S. Gypsum Thermafiber. This is a porous absorbent material containing air within restricted spaces which is pumped back and forth when sound energy reaches the material, causing frictional losses which occur as heat, thus reducing the sound energy. Other materials, such as Thermafiber, Fiberglas, Spintex, mineral wool or glass wool, or similar materials, could be used for matrix 17. The thickness of the matrix is such that it will occupy a substantial portion of the thickness of frame 12, as seen in FIG. 1. Matrix 17 has a back surface 18 which is flush with one side of the wider or female channel 15, and a front surface 19 flush with the other side of the narrower or male channel 16.

A face sheet 21 and a back sheet 22 are disposed on opposite sides of matrix 17 and are secured to frame 12 by spot welding or bending at the edges, as seen in FIG. 1. Like frame 12, plates 21 and 22 may be fabricated of sheet metal such as stainless, aluminum, galvinized or aluminized steel, or cold rolled or hot rolled steel. Back sheet 22 is of solid construction, but face sheet 21 is perforated, preferably with a large number of relatively small holes, so that a substantial portion of its total area is open. While back sheet 22 is in engagement with surface 18 of matrix 17, face sheet 21 is spaced a substantial distance therefrom, creating an air space or corridor 23 between the face sheet and matrix 17. Solid sheet 22 is a relatively stiff, thick airtight sheet which offers a great deal of resistance to sound pressured air and acts in conjunction with the matrix as an excellent sound barrier. Sound energy will be lost when it impinges upon perforated plate 21, and a small amount of sound will be reflected when it strikes the solid or reflective areas. A large portion of sound will diffract around the reflective areas and enter air space 23 because it offers very little resistance.

The edges 24 and 25 of sheets 21 and 22 respectively are bent around the flanges of female channel 15 whereas edges 26 and 27 of these sheets are spot-welded to male channel 16. The dimensions of the parts are such that, when adjacent panels are assembled, edges 26 and 27 of the sheets of one panel will fit between the plate edges 24 and 25 of an adjacent panel.

A plastic skin 28 overlies and engages face 19 of matrix 17. This skin is fabricated of an air and water-tight material which is thin, limp and flexible and offers little resistance between the sound pressured air from the outside and the matrix. The plastic skin could be fabricated of polyvinyl chloride, Mylar, Visqueen or similar materials. The skin has margins 29 around its edges which overlap the edges of the matrix, fitting between the matrix and frame.

Means are provided for maintaining the air space 23 between sheet 21 and skin 28, this means comprising a wire grid 31 disposed between the plate and grid. This spacer will contact both sheet 21 and skin 28 at widely spaced points, leaving substantial gaps for distribution of sound-activated air over the entire skin area.

In operation, the large portion of sound diffracting around the reflective areas of face sheet 21 and entering air space 23 will be distributed with relatively even pressure over the entire area of skin 28. Because of the nature of the skin, the pressure of the sound waves will cause it to move in a pumping fashion, thus creating air movement in the restricted matrix channels. Thus, sound pressure is transferred to the matrix by the plastic skin which acts in effect as a diaphragmatic absorber in addition to its matrix-protective function.

Although the dimensions of the parts may be varied to suit requirements, a suitable panel was constructed having 18 gage galvanized frame channels, a 3 ¾ inch thick matrix of U.S. Gypsum 4 ½ pound density Thermafiber, a skin of one mil thick polyvinyl chloride, a front sheet of 22 gage galvanized metal with 3/32 inch diameter holes (47 holes per square inch or 33% open area) a back sheet of 16 gage galvanized metal, and a spacer fabricated of a 16 gage galvanized wire grid, with space 23 being approximately ¼ inch wide. Tests were performed on two panels comprised of these same basic materials with the primary difference between the panels being that one was constructed with the air gap 23 between the face plate and skin, while the other panel did not have an air gap. The panel with the air gap had a noise reduction coefficient of 95% whereas the other only had 20%. It is believed that this substantial difference was because the construction with the air corridor permitted a larger amount of sound-activated air to enter the panel and to be absorbed, whereas the panel without the air corridor had a much higher reflective area making it difficult for the sound-activated air to enter the panel.

I claim:

1. A sandwich type acoustical panel comprising a frame, a fibrous matrix disposed within said frame, a plastic skin of thin, limp, flexible air- and water-tight protective material overlying and engaging the front face of said matrix, said skin having marginal portions overlying the edges of said matrix and fitting between said matrix and said frame, a metal face sheet secured along its opposite edges to the front of said frame and in spaced relation with said skin, said face sheet being perforated so that a substantial portion of its area is open, a solid metal back sheet secured to the back of said frame, and a grid spacer disposed in the air space between said face sheet and skin.

2. The combination according to claim 1, said frame having outwardly open channel members along opposite sides, one longitudinal channel being narrower than the other whereby adjacent panels may be interlocked with male and female joints.

3. The combination according to claim 1, the air space between said front plate and skin being approximately one-fourth inch, said matrix being fabricated of mineral wool.

4. The combination according to claim 1, said skin being one mil thick polyvinyl chloride.

* * * * *